(12) United States Patent
Tacx et al.

(10) Patent No.: US 10,526,476 B2
(45) Date of Patent: Jan. 7, 2020

(54) HIGH-PRESSURE POLYMERISATION PROCESS FOR THE PREPARATION OF POLYETHYLENE

(71) Applicant: SABIC Global Technologies B.V., Bergen op Zoom (NL)

(72) Inventors: Jacobus Christinus Josephus Franciscus Tacx, Roermond (NL); Franciscus Petrus Hermanus Schreurs, Maastricht (NL); Diego Mauricio Castaneda Zuniga, Maastricht (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/561,680

(22) PCT Filed: Mar. 10, 2016

(86) PCT No.: PCT/EP2016/055185
§ 371 (c)(1),
(2) Date: Sep. 26, 2017

(87) PCT Pub. No.: WO2016/150726
PCT Pub. Date: Sep. 29, 2016

(65) Prior Publication Data
US 2018/0079896 A1    Mar. 22, 2018

(30) Foreign Application Priority Data

Mar. 26, 2015    (EP) .................................. 15161004

(51) Int. Cl.
C08L 23/04        (2006.01)
C08F 110/02       (2006.01)
C09D 123/06       (2006.01)

(52) U.S. Cl.
CPC .............. *C08L 23/04* (2013.01); *C08F 110/02* (2013.01); *C09D 123/06* (2013.01); *C08L 2205/025* (2013.01); *C08L 2207/066* (2013.01)

(58) Field of Classification Search
CPC .......... C08L 23/04; C08L 23/06; C08L 23/08; C08L 2205/025; C08F 10/02; C08F 110/02; C08F 210/02; C08F 210/16
See application file for complete search history.

(56) References Cited

U.S. PATENT DOCUMENTS 4,547,551 A * 10/1985 Bailey ..................... C08L 23/06
                                                            264/564

FOREIGN PATENT DOCUMENTS

| WO | 2006094723 A1 | 9/2006 |
| WO | 2008008835 A2 | 1/2008 |
| WO | 2009085922 A1 | 7/2009 |
| WO | 2014190036 A1 | 11/2014 |

OTHER PUBLICATIONS

Giles, Harold et al., "Extrusion Coating and Lamination", Extrusion: The Definitve Processing Guide and Handbook, 2005, pp. 465-468.
International Search Report for International Application No. PCT/EP2016/055185; dated May 13, 2016; 5 pages.
Kaltenbacher, E.J. et al., "The Use of Melt Strength in Predicting the Possibility of Polyethylene Extrusion Coating Resins", Tappi; Januray 1967, vol. 50, No. 1, pp. 20-28.
Neilen, Marcel; "Statistical Models to describe the correlations between the molecular mass distribution and the extrusion coating process ability", 2003 TAPPI 9th European Place Conference, May 12-14; Rome.
Peacock, Andrew J., "Production Processes", Handbook of Polyethylene, Marcel Dekker; 2000, pp. 43-66.
Tackx, P. et al., "Chain Architecture of LDPE as a Function of Molar Mass Using Size Exclusion Chromatography and Multi-Angle Laser Light Scattering (SEC-MALLS)" Polymer; 1998, vol. 39, No. 14, pp. 3109-3113.
Written Opinion of the International Search Report for International Application No. PCT/EP2016/055185; dated May 13, 2016; 5 pages.

* cited by examiner

*Primary Examiner* — Roberto Rabago
(74) *Attorney, Agent, or Firm* — Cantor Colburn LLP

(57) ABSTRACT

The invention relates to a high-pressure polymerisation process for the preparation of polyethylene. A polymer is added to the extruder via a side feed dosage unit wherein the $MFI_{sf}$ of the polymer added via the side feed dosage unit has a higher value than the melt flow index ($MFL_{end}$) of the polyethylene end product and wherein the Mw/Mn of the end product increases at least 15% compared to the product wherein no polymer is dosed via the side feed.

13 Claims, No Drawings

HIGH-PRESSURE POLYMERISATION PROCESS FOR THE PREPARATION OF POLYETHYLENE

CROSS REFERENCE TO RELATED APPLICATIONS

This application is a 371 of International Application No. PCT/EP2016/055185, filed Mar. 10, 2016, which claims priority to European Application No. 15161004.5, filed Mar. 26, 2015, both of which are incorporated herein by reference in their entirety.

The invention relates a high-pressure polymerisation process for the preparation of polyethylene.

Andrew Peacock (Plastics Engineering 57; 43-66, 2000) discloses the high-pressure polymerisation process of ethylene. Peacock describes the free radical chemical processes, the high pressure production facilities and the high pressure reaction conditions. The process may take place in a tubular reactor or in an autoclave reactor. Reactors can take one of two forms being either an autoclave, with a height-to-diameter ratio in the region of 5-20, or a tubular reactor, with a length-to-diameter ratio from a few hundred up to tens of thousands. These two divergent reactor geometries pose uniquely different chemical engineering problems requiring disparate control conditions. Tubular and autoclave reactors with their disparate profiles require different methods of temperature control.

The autoclave process and the tubular process result in different chain architecture (Tackx and Tacx, Polymer Volume 39, number 14, pp 3109-3113, 1998) and different molecular weight distribution of the polymer (Kaltenbacher, Vol 50, No 1, January 1967, TAPPI).

The ethylene entering an autoclave reactor is precooled, so that it can absorb some of the heat generated by the polymerization reaction already in advance. As the temperature of the incoming stream rises, the initiator decomposes. The surface-to-volume ratio of autoclave reactors is so low that external cooling has little effect. Autoclave reactors are stirred vigorously to reduce the likelihood of localized hot spots. Typical average residence times of ethylene within an autoclave are in the region between 10 seconds and 5 min as unreacted ethylene exits the autoclave with the polyethylene product it carries away excess heat. In a tubular reactor the incoming ethylene is preheated to decompose the initiator, thereby starting polymerization. Once the reaction is under way, the excess heat is removed by external cooling, which effective is given the narrow diameter of the tube. The residence time of reactants within a tubular reactor is typically 100-300 sec. The difference between autoclave and tubular reactors is the essential lack of back mixing in the tubular reactor and the high degree of back mixing in the autoclave which presents distinct opportunities for the control of reaction conditions and hence the molecular structure of the products. In the polyethylene high-pressure process polyethylene is prepared by radical polymerisation in supercritical ethylene.

The polymerisation in tubular reactors can be started by metering an initiator such as for example an organic peroxide, azodicarboxylic acid ester and azodicarboxylic acid dinitrile that decompose into radicals. Oxygen and air are also are suitable to serve as an initiator. The ethylene, which is compressed to the desired pressure, flows through the reactor tube, which is provided on the outside with a jacket through which cooling water flows in order to remove the generated heat of reaction via the wall. This reactor has a length between for example 1000 meters and 3000 meters and an internal diameter between for example 0.01 meters and 0.10 meter. The incoming ethylene is first heated to the decomposition temperature of the initiator, whereupon an initiator solution is metered and the polymerisation subsequently starts. The desired peak temperature is attained by controlling the quantity of initiator. Thereafter the mixture cools and, after the temperature has dropped to a sufficiently low level, initiator is metered one or more times again via one of the initiator injection points. The amount of injection points may range for example between 2 and 5. After depressurizing the product, the polymer is fed into a single screw extruder. The extruder may contain one or more side feed extruders. At the end of this process, the WI is measured. After measurement, the polymer is pelletized. Downstream of the reactor the obtained product is transported to the product silos after for example separation and drying.

Generally, the temperature in the reaction zone of the high-pressure reactor ranges between 150° C. and 330° C. and the reactor inlet pressure lies between 50 MPa and 500 MPa where reactor inlet pressure refers to the (total) pressure at which the feed stream leaves the compressor and enters the reactor. Preferably, this pressure ranges between 150 MPa and 400 MPa.

The high-pressure reactors are suitable both for the preparation of a homopolymer of ethylene and for the preparation of a copolymer of ethylene and one or more comonomers copolymerisable therewith. Suitable comonomers are for example α-olefins with 2-12 C atoms, ethylenically unsaturated carboxylic acids, ethylenically unsaturated $C_{4-15}$ carboxylic acid esters or their anhydrides. Examples of suitable α-olefins to be applied as a comonomer are propylene and/or butene. Examples of suitable ethylenically unsaturated carboxylic acids are maleic acid, fumaric acid, itaconic acid, acrylic acid, methacrylic acid and/or crotonic acid. Examples of ethylenically unsaturated $C_{4-15}$ carboxylic acid esters or their anhydrides are methylmethacrylate, ethylacrylate, n-butyl methacrylate, vinyl acetate, methacrylic acid anhydride, maleic acid anhydride, 1,4-butanedioldimethacrylate, hexanediol dimethacrylate, 1,3-butylene glycol dimethacrylate, ethylene glycol dimethacrylate, dodecanediol dimethacrylate, trimethylol propane trimethacrylate, trimethacrylate ester and/or itaconic acid anhydride. Also bifunctional alkadienes for example 1,5-hexadiene, 1,7-octadiene, 1,9-decadiene and 1,13-tetradecadiene may be applied. The quantity of comonomer in the polymer is dependent on the desired application.

Suitable organic peroxides are for example peroxyester, peroxyketone, peroxyketal and peroxycarbonate such as di-2-ethylhexyl-peroxydicarbonate, diacetylperoxydicarbonate, dicyclohexyl-peroxydicarbonate, tert.-amylperpivalate, cumyl perneodecanoate, tert.-butylperneodecanoate, tert.-butyl perpivalate, tert.-butylpermaleinate, tert.-butylperisononanoate, tert.-butylperbenzoate, tert,-butylperoxy-2-ethylhexanoate. tert.-butyl-hydroperoxide, d-tert. butyl peroxide, di-isopropylbenzol hydroperoxide, di-isononanoyl peroxide, didecanoylperoxide, cumol hydroperoxide, methyl isobutyl ketone hydroperoxide, 2.2-bis-(tert.-butylperoxy)-butane and/or 3.4-dimethyl-3.4-diphenylhexane. Also bifunctional peroxides including for example 2,5-dimethyl-2,5-di-tertiair-butylperoxyhexane, 2,5-dimethyl-2,5-tertiair-peroxyhexyne-3 3,6,9-triethyl-3,6,9-trimethyl-1,4,7-triperoxononane, 3,3,6,6,9,9-hexamethyl-1,2,4,5-tetraoxacyclononane, n-ethyl-4,4-di-tertiair-butylperoxyvalerate, 1,1-di-tertiair-butylperoxy-3,3,5-trimethylcyclohexane, ethyl-3,3-di-tertiair-butylperoxybutyrate 1,1-di-tertiair-butylperoxycyclohexane, 2,2-di-tertiair-butylperoxybutane ethyl-3,3-di-tertair-amyl peroxy butyrate, 2,2-di-4,4-di-tertiair-butylperoxycyclohexyl propane, methyl-isobutyl-peroxide, 1,1-di-tertiair-amylperoxycyclohexane, 1,1-di-tertiair-butylperoxycyclohexane, 2,5-di-methyl-2,5-di-2-ethyl-hexanoylperoxyhexane and/or 1,4-di-tertiair-butylperoxycarbocyclohexane may be applied.

The reaction can be optimally controlled by metering different initiators or mixtures of initiators at the different initiator injection points. Generally, the initiator concentration ranges between 0.5 ppm and 100 ppm relative to the quantity of ethylene.

During the polymerisation it is possible to add inhibitors, scavengers and/or a chain regulator. Chain transfer is the process by which the growth of a polyethylene chain terminates in such a way that the free radical associated with it transfers to another molecule on which further chain growth occurs. The molecule to which the free radical is transferred can be either ethylene or a deliberately added chain transfer agent (CTA) such as a solvent molecule. Generally, the effect of adding a chain transfer agent is to reduce the average molecular weight of the resin and as a rule, chain transfer is controlled by altering reaction conditions and by the addition of chain transfer agents.

The compressed pressurized ethylene fed through reactor front inlet may also comprise chain transfer agent.

Examples of suitable chain transfer agents include cyclopropane, methane, t-butanol, perfluoropropane, deuterobenzene, ethane, ethylene oxide, 2,2-dimethylpropane, benzene, dimethyl sulfoxide, vinyl methyl ether, methanol, propane, 2-methyl-3-buten-2-ol, methyl acetate, t-butyl acetate, methyl formate, ethyl acetate, butane, triphenylphosphine, methylamine, methyl benzoate, ethyl benzoate, N,N-diisopropylacetamide, 2,2,4-trimethylpentane, n-hexane, isobutane, dimethoxymethane, ethanol, n-heptane, n-butyl acetate, cyclohexane, methylcyclohexane, 1,2-dichlorethane, acetronitrile, N-ethylacetamide, propylene, n-decane, N,N-diethylacetamide, cyclopentane, acetic anhydride, n-tridecane, n-butyl benzoate, isopropanol, toluene, acetone, 4,4-dimethylpentene-1, trimethylamine, N,N-dimethylacetamide, isobutylene, n-butyl isocyanate, methyl butyrate, n-butylamine, N,N-dimethylformamide, diethyl sulfide, diisobutylene, tetrahydrofuran, 4-methylpentene-1, p-xylene, p-dioxane, trimethylamine, butene-2, 1-bromo-2-chlorethane, octene-1,2-methylbutene-2, cumene, butene-1, methyl vinyl sulfide, n-butyronitrile, 2-methylbutene-1, ethylbenzene, n-hexadecene, 2-butanone, n-butyl isothiocyanate, methyl 3-cyanopropionate, tri-n-butylamine, 3-methyl-2-butanone, isobutyronitrile, di-n-butylamine, methyl chloroacetate, 3-methylbutene-1, 1,2-dibromoethane, dimethylamine, benzaldehyde, chloroform, 2-ethylhexene-1, propionaldehyde, 1,4-dichlorobutene-2, tri-n-butylphosphine, dimethylphosphine, methyl cyanoacetate, carbon tetrachloride, bromotrichloromethane, di-n-butylphosphine, acetaldehyde, hydrogen and phosphine.

The chain transfer agent may be used as a solute in a solvent. The solvent may be for example $C_5$-$C_{20}$ normal or iso paraffin or any other solvent suitable in a high-pressure polymerization process.

The polymer melt from the final stage of the product separator will typically be fed to one or more hot melt extruders, for combination with additives, extruding and pelletizing.

LDPE obtained with a high-pressure polymerization process is used for example in the production of films, extrusion coating products, master batches and rotational molding products.

It may be a disadvantage of LDPE obtained with a high pressure tubular or autoclave polymerisation process that the melt elasticity is not sufficient to obtain the properties as required in for example an extrusion coating process.

It is the object of the present invention to provide a high-pressure polymerisation process for the preparation of LDPE with increased melt strength at a specific chosen melt index.

The invention is characterized in that polymer is added to the extruder via a side feed dosage unit wherein the melt flow index of the polymer added via the side feed dosage unit ($MFI_{sf}$) has a higher value than the melt flow index of the polyethylene end product ($MFI_{end}$) and wherein the Mw/Mn of the end product increases at least 15% compared to the Mw/Mn of the product wherein no polymer is dosed via the side feed.

$MFI_{sf}$ means MFI of polymer added via the side feed dosage unit.

$MFI_{end}$ means the MFI of the end product obtained after the dosage of the polymer via the side feed dosage unit.

The melt flow index (melt flow rate) of the polymer added via the side feed dosage unit ($MFI_{sf}$) and the melt flow index of the polyethylene end product ($MFI_{end}$) are measured according to ISO1133:2011 at 190° C. and 2.16 kg.

The Melt Flow Index of LDPE is measured according to ISO1133:2011 at 190° C. and 2.16 kg.

$MFI_{end}$ ranges between 0.1 and 120 dg/minute, preferably between 0.3 and 10.0 dg/minute, more preferably between 4 and 8 dg/minute.

$MFI_{sf}$ has a higher value than the melt flow index of the polyethylene end product $MFI_{end}$.

The value for Mw/Mn of the end product ranges between 7 and 35. Mn and Mw are determined via size exclusion chromatography performed according to Iedema et. al., Polymer 54 (2013) pp. 4093-4104, section 2.2 SEC-MALS on p. 4095.

According to a preferred embodiment of the invention, the Mw/Mn of the end product increases at least 20% compared to the Mw/Mn of the product wherein no polymer is dosed via the side feed.

According to a preferred embodiment of the invention, the Mw/Mn of the end product increases at least 30% compared to the Mw/Mn of the product wherein no polymer is dosed via the side feed.

According to a preferred embodiment of the invention, the polymer is polyethylene.

According to a further preferred embodiment of the invention, the polyethylene is LDPE, HDPE, LLDPE or mixtures thereof.

Most preferably the polyethylene is LDPE.

According to a preferred embodiment of the invention the side feed dosage unit is a side feed extruder or a pump.

Most preferably the dosage unit is a side feed extruder.

The high pressure polymerisation process for the preparation of LDPE may be a tubular or an autoclave process.

Preferably the process is a tubular process.

It is possible to install the side feed dosage unit anywhere in the polymerization reactor system.

Preferably the side feed dosage unit is installed in the extruder.

Preferably the side feed dosage unit is installed as early as possible in the main extruder. This position will result in better mixing results.

It is possible to apply more side feed extruders at different places along the extruder.

The polyethylene end product comprises ethylene homo and/or copolymers.

According to a further preferred embodiment of the invention the weight ratio polymer added via side feed: polyethylene produced in the high pressure reactor ranges between 10:1 and 1:10.

According to a preferred embodiment of the invention the range is between 10:1 and 8:1. at least: 9:1

The process according to the invention results in at least 15% broader molecular weight distribution (MWD) at a same melt index of polyethylene end product.

It is an advantage of the process according to the invention that the melt index of the final product must be constant while the side feed extruder is dosing a higher melt index. The plant conditions for example the CTA concentration will be adjusted in such a way that the material produced in the polymerization section has a lower melt index than the final material. Consequently, the molar mass distribution broadens at the same melt index. Furthermore, the elastic properties can be improved at the same melt index.

It is advantageous that better elastic properties for example melt strength, neck-in and balloon stability at the same MFI are obtained which results in an economical advantage.

Another advantage is that more flexibility in tuning melt properties of product over the whole MFI range is obtained.

A further advantage is that during the production of blown films a higher MI can be applied while maintaining balloon stability (increased throughput or for multilayer purposes).

The elastic properties of the final polyethylene may be characterized by neck-in. Neck-in is disclosed during the presentation "Statistical models to describe the correlations between the molecular mass distribution and the extrusion coating process ability" by Marcel Neilen on the 2003 $9^{th}$ European PLACE Conference, May 12-14, 2003 in Rome and in WO2006094723.

Generally the density of LDPE ranges between 915 kg/m$^3$ and 930 kg/m$^3$ (according to IS01183) and the melt index ranges between 0.1 dg/minute and 120 dg/minute (according to ISO1133:2011 at 190° C. and 2.16 kg).

LDPE can be used alone, blended or coextruded for a variety of packaging, construction, agricultural, industrial and consumer applications.

The LDPE obtained with the process according to the invention is suitable to be used in extrusion coating applications for coatings on various substrates such as for example paper, board, cloth, aluminium and other materials. The coatings provide for example a very good adhesion, heat sealing performance and moisture barrier to the substrate. Suitable fields of application are for example liquid packaging cartons, aseptic packaging, food packaging, tapes, paper board cups, food carton stock, frozen food and dual oven able trays, pouches, multi wall bags, release papers and photographic papers such as for example ink jet papers. The extrusion coating process is described for example by Harold Giles in Extrusion: The Definitive Processing Guide and Handbook (ISBN 0-8155-1473-50) in the FIG. 47.2 at page 465.

The present invention is also directed to an extrusion coating composition comprising polyethylene obtained with the process according to the present invention. These compositions may also comprise other additives being dependent on the desired application.

The polymer obtained with the process according to the invention can also be applied in for example the film segment, for extruded products, in the cast film segment, in packaging applications, in moulding applications for example closures and medical and consumer bottles, in wire and cable coating applications for electrical and communication cables, in foams, in master batches and in blown films.

Master batches may also be added via a side extruder. Generally, a master batch is a concentrated mixture of pigments and/or additives encapsulated during a heat process into a carrier resin, which is then cooled and cut into a granular shape. However, the addition of a master batch does not result in the desired broadening of the molecular weight distribution. When applying a master batch the Mw/Mn of the end product does not increase at least 15% compared to the product wherein no master batch is dosed via the side feed. It is possible to add additives (for example flame retardants, colourants and stabilizer) up to 1000 ppm in the polymer.

WO2008008835 discloses a bimodal polymer comprising Ziegler-Natta catalyzed polyethylene, having a density of from 0.930 g/cc to 0.960 g/cc, and a molecular weight distribution of from 10 to 25, wherein an article formed from the polymer has a PENT of at least 1500 using test ASTM F 1473. The polymer is applied in the production of pipes.

WO2014190036 discloses a composition comprising a first ethylene-based polymer formed by a high pressure, free-radical polymerization process comprising specific properties and a second ethylene-based polymer having a specific melt index.

WO2009085922 discloses a composition comprising a blend, which comprises a high molecular weight ethylene-based polymer and a low molecular weight ethylene-based polymer. The high molecular weight ethylene-based polymer has a density less than, or equal to, 0.955 g/cm$^3$. The blend has a high load melt index greater than, or equal to, 15 g/10 min, and a molecular weight distribution greater than, or equal to, 15.

WO2008008835, WO2014190036 and WO2009085922 do not disclose and do not indicate a high pressure polymerisation process for the preparation of polyethylene with an additional step wherein a polymer is added to the extruder via a side feed dosage unit.

WO2008008835, WO2014190036 and WO2009085922 do not disclose and do not indicate a process wherein the plant conditions such as the CTA concentration will be adjusted in such a way that the material produced in the polymerization section has a lower melt index than the final material and wherein the molar mass distribution broadens at the same melt index.

The invention claimed is:

1. A polymerisation process for the preparation of polyethylene comprising preparing a homopolymer of ethylene or a copolymer of ethylene and one or more comonomers to form a polymer melt, feeding the polymer melt to one or more hot melt extruders and adding a second polymer to the one or more hot melt extruders via a side feed dosage unit wherein the $MFI_{sf}$ of the second polymer added via the side feed dosage unit has a higher value than the melt flow index ($MFI_{end}$) of the polyethylene end product and wherein the Mw/Mn of the end product increases at least 15% compared to the Mw/Mn of the product wherein no polymer is dosed via the side feed dosage unit.

2. The process according to claim 1, wherein the second polymer is polyethylene.

3. The process according to claim 2, wherein the polyethylene is LDPE, LLDPE or HDPE.

4. The process according to claim 3, wherein the polyethylene is LDPE.

5. The process according to claim 1, wherein the side feed dosage unit is a side feed extruder.

6. The process according to claim 1, wherein the polymerisation process is a tubular polymerisation process.

7. The process according to claim 1, wherein the side feed dosage unit is installed in the extruder.

8. The process according to claim 1, wherein the weight ratio polymer added via side feed: polymer melt produced in a high pressure reactor ranges between 10:1 and 1:10.

9. The process according to claim 1, wherein the $MFI_{end}$ ranges between 0.1 and 120 dg/minute.

10. The process according to claim 1, wherein the value for Mw/Mn of the end product ranges between 7 and 35.

11. The process according to claim 1, further comprising adding a chain transfer agent to the polymer melt, while simultaneously maintaining a constant melt flow index of the polyethylene end product.

12. The process according to claim 1, wherein the polymerisation takes place in a reactor having an inlet pressure of 50 MPa to 500 MPa.

13. The process according to claim 1, wherein the polymerisation takes place in a reactor having an inlet pressure of 150 MPa to 400 MPa.

* * * * *